(No Model.)
G. B. ST. JOHN.
VEHICLE COUPLING.
No. 435,865. Patented Sept. 2, 1890.
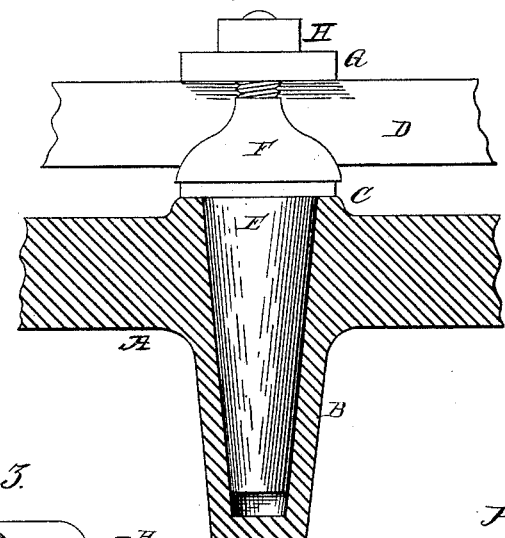
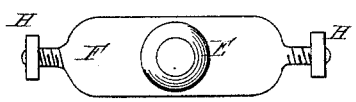
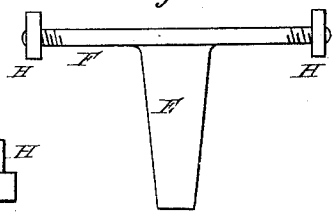
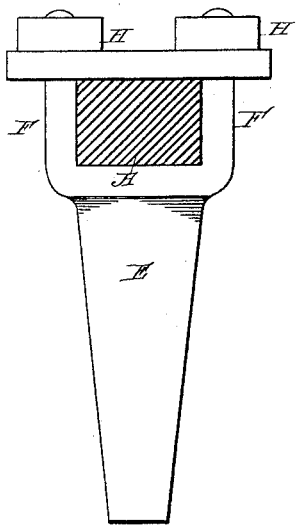
Attest
W. H. Meyers.
Frank G. Clark
Inventor.
G. B. St John.
By J. M. St John
Atty.

UNITED STATES PATENT OFFICE.

GARLAND B. ST. JOHN, OF KALAMAZOO, MICHIGAN.

VEHICLE-COUPLING.

SPECIFICATION forming part of Letters Patent No. 435,865, dated September 2, 1890.

Application filed May 22, 1890. Serial No. 352,807. (No model.)

*To all whom it may concern:*

Be it known that I, GARLAND B. ST. JOHN, a citizen of the United States, residing at Kalamazoo, in the county of Kalamazoo and State of Michigan, have invented certain new and useful Improvements in Front and Rear Gear-Connections for Vehicles; and I do hereby declare the following to be a full, clear, and exact description of the invention, such as will enable others skilled in the art to which it appertains to make and use the same.

This invention relates to devices for connecting the front and rear axles of the running-gear of vehicles, and is in the nature of the device for which Letters Patent were issued to me on the 11th day of March, 1890, No. 422,992.

The object of this invention is to improve the construction of the parts so as to secure the greatest strength and efficiency without a corresponding increase in material or cost of manufacture.

The invention consists in the construction, combination, and arrangement of parts, as hereinafter fully set forth and claimed.

In the accompanying drawings, forming a part of this specification, Figure 1 is a fragmentary view of the front axle of a vehicle and the cross-bar connecting therewith by a pivot-pin, the axle being in central longitudinal section. Fig. 2 is a transverse section of the cross-bar, showing the pin in full. Fig. 3 is a plan view of the pivot-pin in the process of formation, and Fig. 4 a side elevation of the same.

Similar letters of reference indicate corresponding parts.

One part of my invention relates to improvements in the formation of the socket, and another to that of the pivot-pin entering the same.

By reference to Letters Patent above referred to it will be seen that I couple the front and rear gear of a vehicle by means of a conical pin and socket instead of the common "fifth-wheel." The general nature of the device being therein fully described and claimed need not herein be particularly set forth, except as may be necessary to a proper understanding of the improvements herein.

Referring now to the drawings, A is the middle portion of the forward axle of a vehicle, made of iron or steel, and B is a socket formed in and of the material of said axle. This is done preferably by "upsetting" the material at this point and forming the conical socket therein by swaging or drop-forging. The greater length of the socket should extend below the axle; but in practice I also form a boss C on the upper side of the same. This socket is closed at the bottom to retain oil for the lubrication of the parts. By this construction the axle is but slightly enlarged at the middle, while at the same time it is not weakened by the socket therein.

To the cross-bar D is secured a pivot-pin E. This is a conical plug of iron or steel, preferably the latter, with a stirrup or clip F formed at the upper end, whereby it is clamped to the cross-bar by means of the strap G and the nuts H H. The construction of this pivot-pin is illustrated in Figs. 3 and 4. The strap F, having threaded ends, is welded to the larger end of the pin, and the sides are then turned up to form a stirrup or clip, as shown in Fig. 2.

The process of construction just described may be applied to the socket, the downwardly-projecting portion being welded to the axle and the socket then formed therein; but in practice the method above described is preferred. The coupling so made is light and neat in appearance, and being of strong material, as wrought-iron or steel, is very durable.

Instead of being forged, the parts, particularly the pin, may be of annealed cast material, as malleable iron or steel.

Having thus described my invention, what I claim as new, and desire to secure by Letters Patent, is—

1. The herein-described socket formed integral with the forward axle of a vehicle, the said socket being conical to receive a corresponding pivot-pin and closed at the bottom to retain oil, substantially as and for the purpose set forth.

2. In a gear-coupling for vehicles, the combination of the forward axle having a socket formed integral therewith and closed at the bottom to retain oil, a pivot-pin fitted to said socket and having a clip-connection with a cross-bar, and a cross-bar connecting with the body of the vehicle, substantially as and for the purpose set forth.

In testimony whereof I affix my signature in presence of two witnesses.

GARLAND B. ST. JOHN.

Witnesses:
T. F. GIDDINGS,
D. E. GROESBECK.